United States Patent
Fung et al.

(10) Patent No.: US 9,104,808 B2
(45) Date of Patent: *Aug. 11, 2015

(54) DEBUGGING VISUAL AND EMBEDDED PROGRAMS

(71) Applicant: International Business Machines Corporation, Armonk, NY (US)

(72) Inventors: Jane C. Fung, Thornhill (CA); Perry R. Giffen, Kemptville (CA); Paul J. Gooderham, Markham (CA); Malik S. Hemani, Mississauga (CA); Karice L. McIntyre, Nepean (CA); William G. O'Farrell, Markham (CA); Shu X. Tan, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,709

(22) Filed: Oct. 15, 2014

(65) Prior Publication Data

US 2015/0033207 A1 Jan. 29, 2015

Related U.S. Application Data

(63) Continuation of application No. 11/468,619, filed on Aug. 30, 2006, now Pat. No. 8,949,790.

(51) Int. Cl.
*G06F 9/44* (2006.01)
*G06F 11/36* (2006.01)

(52) U.S. Cl.
CPC .............. *G06F 11/3664* (2013.01); *G06F 8/34* (2013.01); *G06F 11/362* (2013.01)

(58) Field of Classification Search
CPC .................... G06F 11/3688; G06F 11/3664
USPC .................................................. 717/124, 125
See application file for complete search history.

(56) References Cited

U.S. PATENT DOCUMENTS

| | | | |
|---|---|---|---|
| 6,067,641 A * | 5/2000 | McInerney et al. | 714/38.13 |
| 6,907,060 B2 | 6/2005 | Yang | |
| 2002/0100016 A1 | 7/2002 | Van De Vanter et al. | |
| 2002/0120919 A1 | 8/2002 | Aizenbud-Reshef et al. | |
| 2003/0028858 A1 | 2/2003 | Hines | |
| 2003/0061600 A1 | 3/2003 | Bates et al. | |
| 2003/0217353 A1 | 11/2003 | Bebout et al. | |
| 2004/0083331 A1 | 4/2004 | Gschwind et al. | |
| 2004/0117769 A1 | 6/2004 | Lauzon et al. | |
| 2005/0034104 A1 | 2/2005 | Pugh et al. | |
| 2005/0044532 A1 | 2/2005 | Pfander et al. | |
| 2005/0204348 A1* | 9/2005 | Horning et al. | 717/140 |

FOREIGN PATENT DOCUMENTS

| | | |
|---|---|---|
| JP | 8171499 | 7/1996 |
| WO | 2004036420 | 4/2004 |

* cited by examiner

*Primary Examiner* — Anna Deng
(74) *Attorney, Agent, or Firm* — Steven L. Nichols; Van Colt, Bagley, Conwall & McCarthy P.C.

(57) ABSTRACT

SMAPs are generated for use in debugging visual paradigms. A system can debug a non-Java source, or a visual paradigm, embedded inside another distinct paradigm. The system may include a visual object ordering system that determines an order number for each of a plurality of visual objects in the visual paradigm, and a mapping system that maps the order number of each visual object to a set of line numbers in the associated code output.

17 Claims, 5 Drawing Sheets

DEBUGGING VISUAL AND EMBEDDED PROGRAMS

BACKGROUND OF THE INVENTION

The invention relates generally to debugging visual programs, and more specifically relates to a system and method for debugging visual paradigms and embedded visual or source programs.

Visual programming environments, or paradigms, such as that provided by IBM® WEBSPHERE® BUSINESS INTEGRATOR, are becoming commonplace for creating computer programs (IBM and WebSphere are registered trademarks of International Business Machines in the US, other countries, or both). Instead of writing lines of code, programmers create programs by linking together transforms that provide predetermined functions (e.g., mapping, business rules, etc.). Transforms are typically represented by boxes in the programming environment that can be linked together with arrows that dictate the flow of the program.

In some instances, the visual paradigm does not include a runtime engine, but instead generates some type of intermediate code, such as JAVA™ source code, which can then be compiled and run by an interpreter, such as a Java virtual machine (JVM). (Java and all Java-based trademarks are trademarks of Sun Microsystems, Inc. in the United States, other countries, or both.) One of the challenges in designing programs using such visual paradigms involves debugging the program. A debugger tool should allow the programmer to step through the visual paradigm to track the behavior of the program. However, because these types of visual paradigms are first translated, e.g., into Java, there is no link back to the visual paradigm when the program is executed, thus making it difficult to implement a debugger tool.

Another area in which a similar challenge exists involves debugging embedded programs. There are situations where one tool uses another tool to generate code to be embedded in another context. For example, Java code might be embedded in an intermediate form to be input into a subsequent code-generation.

As well, in modern development tools, it is often desirable to give users a high level programming paradigm to work with instead of a procedural or object oriented language. For instance, Java Server Pages (JSPs) represent a high-level source code format for generating Java servlets. Often, a visual paradigm is preferred instead. For instance, in the WebSphere Integration Developer, the BPEL (Business Execution Processing Language) editor, the Map editor, and others, can use the Activity Editor to allow the user to visually construct code that is then translated to Java. The Activity Editor is thus an example of an "embedded editor" in which one editor is used within the context of another. The code produced from such an editor is then embedded within the code produced from the parent editor.

A problem that arises revolves around how to debug such embedded code in the code's original context, whether it is JSP, visual expressions, etc. Specifically, the debugging should occur in the context of the parent editor that was driving the creation of the embedded code.

Figure 5:
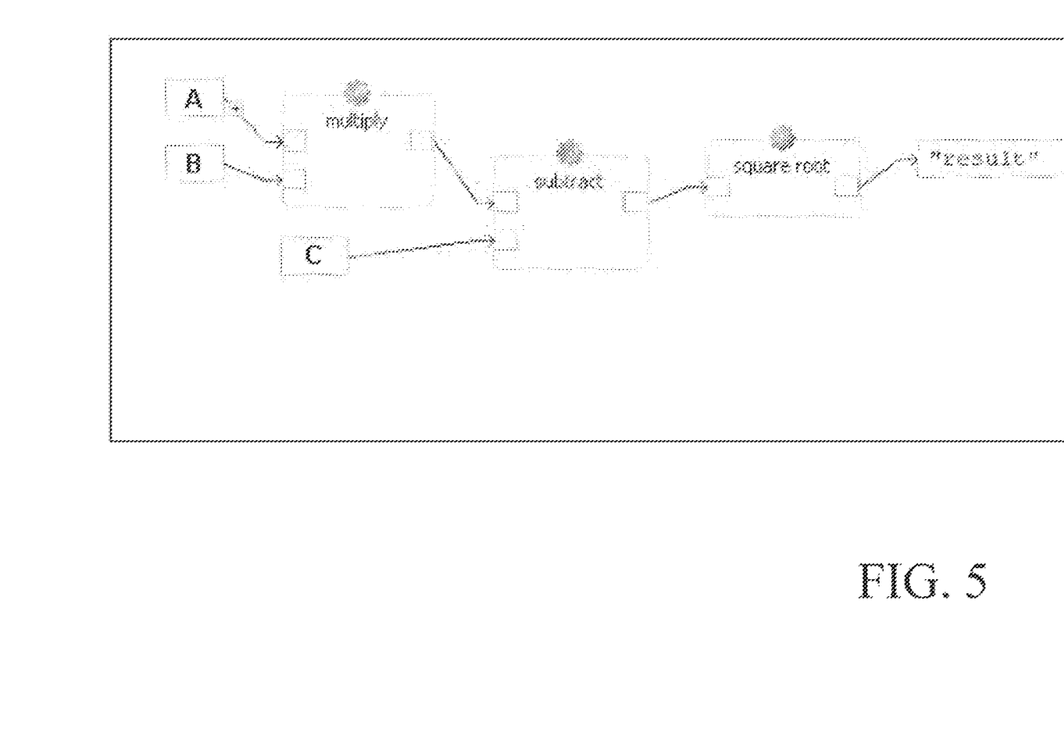
FIG. 5 depicts an activity editor with a visual expression in accordance with an embodiment of the present invention.

When the tool that creates the embedded program is asked to save the program to disk, the program, e.g., the Java program, is typically provided to the parent editor as a block of code that can be incorporated as character data in the persisted form. For example, FIG. 5 depicts a visual expression constructed with an Activity Editor. Having allowed the user to visually draw this expression, the Activity Editor would then generate Java code that that would take three arguments, A, Band C, and would produce a Java expression that multiplies A and B, subtracts C from that, and calculates the square root to produce a result. The generated Java might be embedded in an XML document which would serve as a kind of "intermediate form" for input to a code generator. Assuming the visual expression shown in FIG. 5 was used while creating a data map, the resulting XML might, for example, look like the following:

```
</propertyMap>
<propertyMap executionOrder="2">
<join delimiter=" @" prefix="!">
<input businessObjectVariableRef="ApplicationAddress"
property="addressLine1" />
<input businessObjectVariableRef="ApplicationAddress"
property="addressLine2"/>
<output businessObjectVariableRef="GenericAddress"
property="streetAddress"/>
</join>
</propertyMap>
<propertyMap executionOrder="3">
<split delimiter="-">
<input businessObjectVariableRef="ApplicationAddress"
property="phoneNumber"/>
<output businessObjectVariableRef="GenericAddress"
property="areaCode"/>
</split>
</propertyMap>
...
<propertyMap executionOrder="6">
<customAssignment>
<output businessObjectVariableRef="GenericAddress"
property="isBillingAddress"/>
<javaCode>
int temp1 = 3 + 5;
int temp2 = temp1 + 10;
return Java.lang.math.sqrt(temp2);
</javaCode>
</customAssignment>
</propertyMap>
</businessObjectMap>
```

In the case of the above map, the XML code will itself be used by a code generator to generate Java code. The Java code that lies between the tags <javaCode> and </javaCode> would be placed within that generated Java code. If one were debugging the Java that resulted from the map code generation, one would encounter the Java code from the Activity Editor embedded within it. However, it is not desirable for the user to be debugging generated Java. Instead, the user should debug in the form in which the code was written or composed.

BRIEF SUMMARY OF THE INVENTION

In a first aspect, the invention provides a system for generating an SMAP from a visual paradigm that can be used along with an associated code output by a debugging tool to debug the visual paradigm, comprising: a visual object ordering system that determines an order number for each of a plurality of visual objects in the visual paradigm; and a mapping system that maps the order number of each visual object to a set of line numbers in the associated code output.

In a second aspect, the invention provides a method of generating an SMAP from a visual paradigm that can be used along with an associated code output by a debugging tool to debug the visual paradigm, comprising: determining an order number for each of a plurality of visual objects in the visual paradigm; and mapping the order number of each visual object to a set of line numbers in the associated code output.

In a third aspect, the invention provides a computer program product stored on a computer usable medium for generating an SMAP from a visual paradigm, wherein the SMAP can be used along with an associated code output by a debugging tool to debug the visual paradigm, comprising: program code configured for determining an order number for each of a plurality of visual objects in the visual paradigm; and program code configured for mapping the order number of each visual object to a set of line numbers in the associated code output.

In a fourth aspect, the invention provides a method for generating a source map (SMAP) used for debugging embedded source code, comprising: embedding source code into an intermediate format; generating a relocatable SMAP as comments within the embedded source code; generating program code from the intermediate format that includes the embedded source code; and generating the SMAP from the relocatable SMAP.

In a fifth aspect, the invention provides a computer program product stored on a computer usable medium, which when executed by a computer, generates an SMAP for debugging embedded source code, comprising: program code configured for embedding source code into an intermediate format; program code configured for generating a relocatable SMAP as comments within the embedded source code; program code configured for generating program code from the intermediate format that includes the embedded source code; and program code configured for generating the SMAP from the relocatable SMAP.

In a sixth aspect, the invention provides a system for generating a source map (SMAP) for use in debugging embedded source code, comprising: an embedded editor for embedding source code into an intermediate format and generating a relocatable SMAP within the embedded source code; and a code generator that includes a system for generating program code from the intermediate format that includes the embedded source code, and a system for generating the SMAP from the relocatable SMAP.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
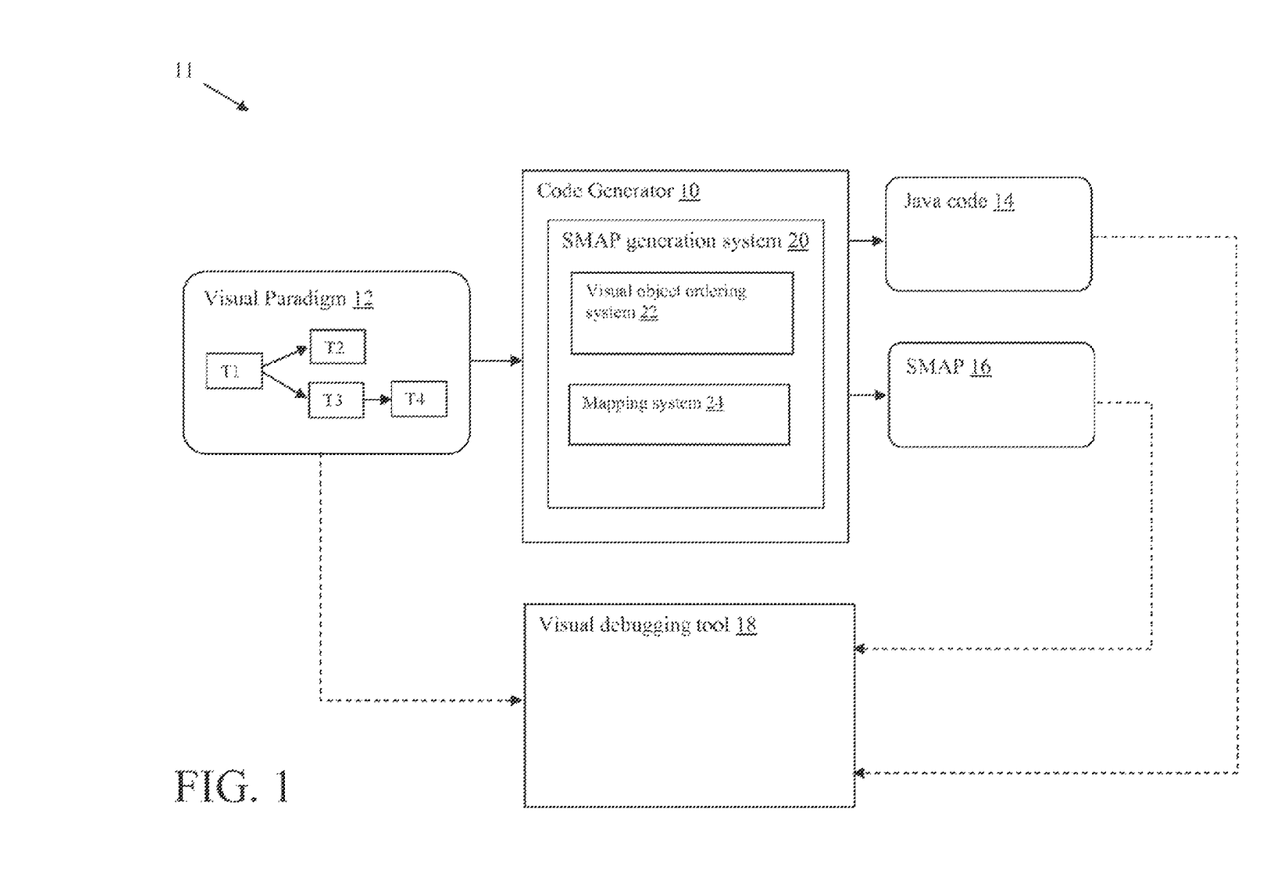
FIG. 1 depicts a code generator having an SMAP generation system for debugging visual paradigms in accordance with an embodiment of the present invention.

Referring now to the drawings, FIG. 1 depicts an illustrative development environment 11 that includes a code generator 10 for generating Java code 14 and an SMAP (Source Map) 16 from a visual paradigm 12. Visual paradigm 12 may be implemented in any visual programming environment (such as IBM Websphere Business Integrator) that utilizes visual objects (e.g., T1, T2, T3, T4) to construct a computer program. SMAP 16, which is described in further detail herein, provides a mapping between line numbers in the Java code 14 and visual objects in the visual paradigm 12. Included in code generator 10 is an SMAP generation system 20 that includes: a visual object ordering system 22 for ordering the visual objects according to a strategy; and a mapping system for mapping the visual objects to line numbers in the Java code 14. Note that while SMAP generation system 20 is shown integrated into code generator 12, SMAP generation system 20 could be implemented apart from code generator, e.g., as a stand-alone system. Also note that while the illustrations are described herein with reference to a system that generates Java code 14, the invention is not limited to systems that generate Java code 14, i.e., it can be utilized with any type of source code generated within a visual programming environment.

Also shown in FIG. 1 is visual debugging tool 18, which imports the visual paradigm 12, Java code 14 and SMAP 16, and provides a debugging platform in which a programmer can debug the visual paradigm 12 (e.g., step through transformations or other visual objects, set breakpoints, examine values, etc.). In one illustrative embodiment, SMAP 16 may be installed as the value of an attribute called, e.g., "SourceOebugExtension" in the class file corresponding to the generated Java code 14. Visual debugging tool 18 can then readily take advantage of the SMAP 16 as long as the attribute is installed in any compiled class file.

Figure 2:
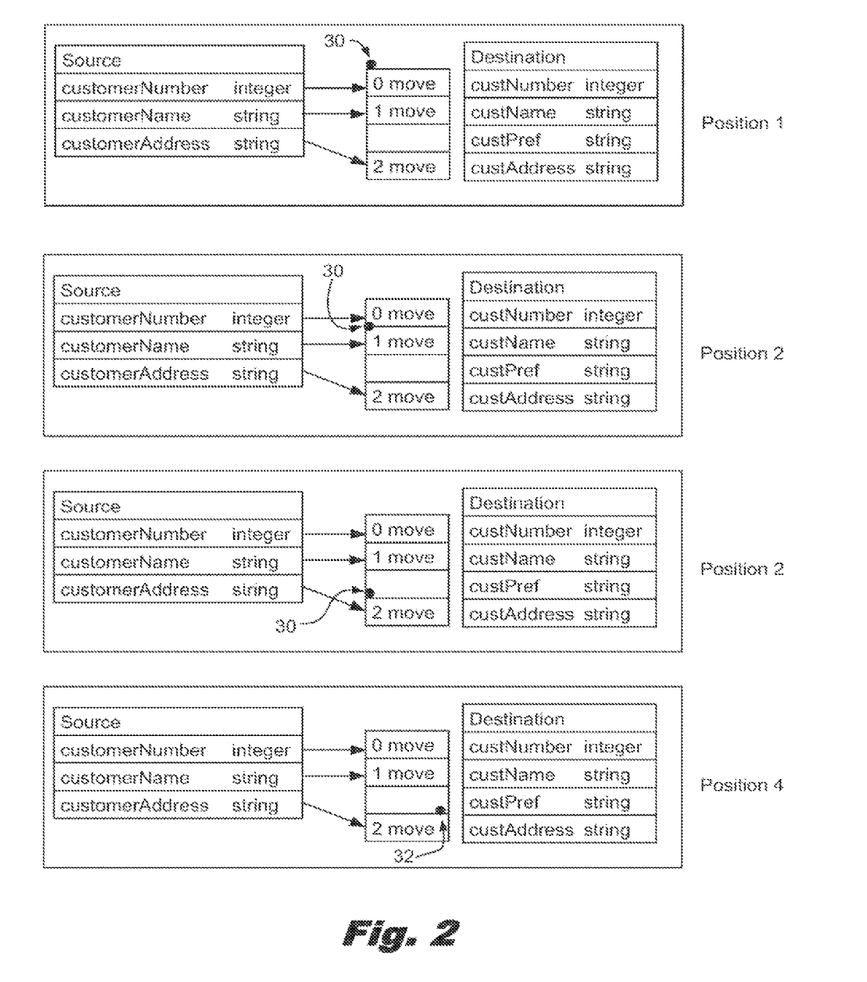
FIG. 2 depicts an example of debugging data transformations in accordance with an embodiment of the present invention.

As noted, debugging typically involves setting breakpoints, stepping through visual objects, etc. Stepping can be done in different ways, depending on how the Java code 14 is generated. In the case of data transforms (i.e., maps), stepping may be done from transform to transform. FIG. 2 illustrates a process for stepping through a map. At position 1, the visual debugging tool 18 (FIG. 1) is stopped at a breakpoint 30. Position 2 shows the breakpoint 30 after a first step, and position 3 shows the breakpoint 30 after a second step. Position 4 shows a post breakpoint 32, which will cause a break just before the individual transform completes.

Referring again to FIG. 1, SMAP generation system 20 operates by associating a number, which will serve as a stand-in for the in-source line number, with each graphical object on the screen that can be a target of a breakpoint or a step action. As noted above, each visual object in the visual paradigm 12 is assigned an "order" number by visual object ordering system 22. Mapping system 24 then maps the visual objects and any custom code embedded therein to the Java code 14. In the case of visual paradigm 12 that utilizes data transforms (e.g., maps), SMAP 16 is generated according to the following rules.

1. The transform "order" number as determined by visual object ordering system 22 is used as an in-source line number;
2. Each such order number is used in the SMAP 16 to identify the method call in the Java code 14 which implements the transform;
3. In one illustrative embodiment, this order number is multiplied by some large integer (e.g., 10,000), and that number is used to identify the last line in the corresponding transform method. This value then provides the in-source line number that will be used for "post" breakpoints;
4. For transforms containing custom code, each line of the user code is identified with an in-source number equal to the last-line number (e.g., 10000 multiplied by the order number)+the offset line number in the custom code.

A simplified example for generating SMAP 16 is described as follows. Assume there are three transforms, numbered 1, 2, and 3. Transform 3 is a custom transform, containing custom code written by the user. The following Java code 14 listing illustrates how the in-source line numbers are used to encode SMAP 16.

```
1    //Generated Java for transform
2    transform__1 ( .. );
3    transform__2( .. );
4    transform__3( .. );
5    public void transform__1 ( .. ){
6        ..generated code ..
7        .. generated code ..
8    }
9    public void transform__2( .. ){
10       .. generated code ..
11       .. generated code ..
12   };
13   public void transform__3( .. ){
14       .. user code ..
15       .. user code ..
16   }
```

The following SMAP table would correspond to this code:

| In Source Line | Out Source Begin Line | End line |
|---|---|---|
| 1 | 2 | 2 |
| 2 | 3 | 3 |
| 3 | 4 | 4 |
| 10000 | 8 | 8 |
| 20000 | 12 | 12 |
| 30001 | 14 | 14 |
| 30002 | 15 | 15 |
| 30000 | 16 | 16 |

As can be seen, transform__1, which is the equivalent of in-source line 1, has an out-source line number that begins and ends on Java code line 2. The last line of transform__1 has an in-source value of 10000 (i.e., 1×10000), which begins and ends on line 8 of the Java code. Similarly, transform__2, which is the equivalent of in-source line 2, has an out-source line number that begins and ends on Java code line 3. The last line of transform__2 has an in-source value of 20000 (i.e., 2×10000), which begins and ends on Java code line 12. Likewise, transform__3, which is the equivalent of in-source line 3, has an out-source line number that begins and ends on Java code line 4. The last line of transform__3 has an in-source value of 30000 (i.e., 3×10000), which begins and ends on Java code line 16. In addition, because transform_3 includes custom code, its code lines are also mapped as an index off of 30000. Namely, the first line of custom code on Java code line 14 is mapped to 30001, and the second line of custom code on Java code line 15 is mapped to 30002.

This arrangement works out nicely for stepping within visual debugging tool 18. Firstly, assuming the conventional step-depth is used (step-depth==OVER) by visual debugging tool 18, doing a step from in-source line 1 will stop on in-source line 2. Another step will stop on in-source line 3. This thus allows the user to traverse each transform. When stopped on line 3, the user will have the option of stepping into his/her custom code, which will result in a pause on in-source line 30001. Stepping from there will stop on 30002. Another step will move to in-source line 30000.

Post breakpoints are handled conveniently as well. Setting a post breakpoint on the first transform is accomplished by setting a breakpoint on in-source line 10000. Similarly, in-source line 20000 corresponds to a post breakpoint on the second transform, and 30000 to a post breakpoint on the third transform. Because these breakpoints will pop inside of the transform methods, some adjustment may be necessary in the stack frames.

This methodology can be used for business rules as well as for data transforms (e.g., maps), because business rules are generated into Java in a similar fashion. With maps, transformation ordering system 22 can simply utilize the order number that is already provided for each map. With business rules, the order numbers are not present. Accordingly, visual object ordering system 22 must generate order numbers (or id's) for each visual object in accordance with a scheme that the visual debugging tool 18 expects. Any methodology may be utilized to handle this, e.g., computed from a pre-order traversal of the tree, utilizing an index into a canonical sorting of id's, etc. In any event, the code generator 10 can use the identical algorithm to deduce the correct integer, which it will use when generating the SMAP.

Figure 3:
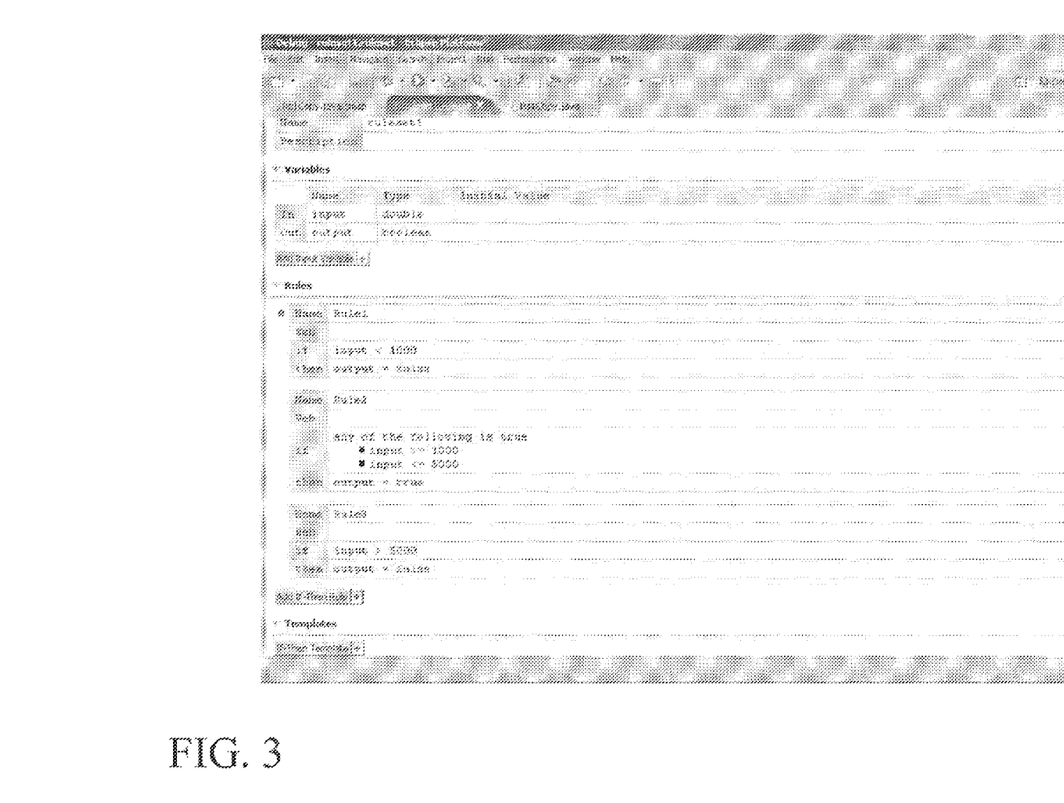
FIG. 3 depicts an example of debugging business rules in accordance with an embodiment of the present invention.

FIG. 3 depicts an example of a visual business rule. From that business rule, the following Java code 14 (FIG. 1) would be generated:

```
1   package codegen;
2
3
4   public class RsCopy {
5       //input parameters
6       double input;
7
8       //output variables
9       booleen output;
10
11      // Internal Variables
12      Boolean exp_3;
13      Boolean exp_8;
14      Boolean exp_9;
15      Boolean exp_13;
16
17      private void Rule1( ) {
18          boolean b_3 = input <1000;
19          exp_3 = new Boolean (b_3);
20          if(b_3) {
21              output = false
22          }
23      }
24
25      private void Rule2( ) {
26          boolean b_8 = input >=1000;
27          exp_8 = new Boolean (b_8);
28          boolean b_9 = input <=5000;
29          exp_9 = new Boolean (b_9);
30          //boolean exp3 = exp_8 && exp_9;
31          if(b_8 && b_9) {
32              output = true ;
33          }
34      }
35
36      private void Rule3( ) {
37          boolean b_13 = input> 5000;
38          exp_13 = new Boolean (b_13);
39          if(b_13) {
40              output = false ;
41          }
42      }
43
44
45
46      public boolean execute(double input) {
47          //init rule set.
48          this, input = input;
49
50          //run rules
51          runRules( );
52          //return result
53          return output;
54      }
55      private String[ ][ ] readData( ) {
56          String[ ][ ] data = new String[ ][ ] {
57              {"1"},
58      {"2"},
59              {"3"},
60          };
61          return data;
62      }
63      private void runRules( ) {
64          /* Read a chunck of data from the runtime (xml, text, whatever)
65          and convert the data into String[ ][ ] */
66          String[ ][ ] data = readData( );
67          for (int i = 0; i < data.length; i++) {
68              String[ ] params = data[i];
69              switch (new Integer(params[0]).intValue( )) {
70                  case 1:
71                      Rule1( );
72                      break;
73                  case 2:
74                      Rule2( );
75                      break;
76                  case 3:
77                      Rule3( );
78                      break;
79              }
80          }
81          boolean finish = true;
82      }
83
84      public static void main (String[ ] args) {
85          Rs1Copy rs = new Rs1 Copy( );
86          rs.execute (5000d);
87      }
88
89  }
```

The associated SMAP 16 would be generated as follows (in a listing format):

```
SMAP
Rs1 Copy.java
BR
*S BR
*F
1 rs1.ruleset
*L
3#1,1 :18,1
900001 #1,1 :19,1
5#1,1 :20,1
888889#1,1 :21,1
8#1,1 :26,1
9#1,1 :28,1
900002#1,1 :31,1
```

```
    11#1,1:32,1
    888891 #1,1 :33,1
    13#1 ,1 :37,1
    900003#1,1 :39,1
    15#1,1 :40,1
    888893#1 ,1 :41 ,1
    888894#1,1 :66,1
    888895#1 ,1 :67,1
    888896#1,1 :68,1
    888897#1,1 :69,1
    888898#1,1 :70,1
    18#1,1 :71,1
    888899#1,1 :72,1
    888900#1,1 :73,1
    19#1,1:74,1
    888901 #1,1 :75,1
    888902#1,1 :76,1
    20#1 ,1 :77,1
    888903#1,1 :78,1
    888904#1,1 :79,1
    1000000#1,1 :81,1
    *E
```

Here, in-source numbers (888900, 888901, etc.) are used to map to the model objects associated with the graphical display of the rule, so that breakpoint markers can be drawn, etc. A similar treatment can be applied to rule tables, another rule paradigm not shown here.

As noted above, there are situations where one tool uses another tool to generate code to be embedded in another context (e.g., an intermediate format). An example of this is described above in which Java is embedded into an extensible mark-up language "XML" (e.g., as created by an embedded editor). Since debugging takes place with the context of the intermediate format, there is no line information that allows the embedded code to be debugged.

A relocatable source map (SMAP) is embedded within the code produced by the embedded editor. As discussed, a source map is a mapping from original source objects to generated source lines. In the case of JSPs for instance, the original source objects would be source lines in the JSP code. In the case of a visual paradigm, such as with an Activity Editor, e.g., such as that shown in FIG. 5, the source objects would be numerical id's associated with the activities that are visually presented. When the generated code is in Java, the format of the source map would be in the form of a SMAP as outlined in Java Specification Request JSR-45.

An obvious issue here is that the embedded editor does not have enough information to create a complete SMAP. In particular, the SMAP outlines how the lines of code in a Java class relate to the original source. However, the embedded editor cannot know how the block of Java code will be used eventually in the final code produced. To handle this problem, this aspect of the invention introduces the notion of a relocatable source map. In the case of a Java SMAP, the Java source lines that are included in the SMAP will be relative to the beginning of the block of code produced by the embedded editor. The relocatable SMAP is included in the code in the form of a comment (e.g., information following "//"). Take for example the block of Java code produced in the data map example described in the background. The code with the included relocatable SMAP would look like this:

```
    ...
    <javaCode>
        int temp1 = 3 + 5;
        int temp2 = temp1 + 10;
        return Java.lang.math.sqrt(temp2);
    //++SMAP++*L
        //++SMAP++97:0
        //++SMAP++98:1
    //++SMAP++99:2
        </javaCode>
    ...
```

Note that the relocatable SMAP is placed at the end of the code block. This makes it easier for the embedded editor to generate the relocatable SMAP—as otherwise the insertion of the relocatable SMAP comment would alter the line numbers mentioned.

As described below, the relocatable SMAP uses 0-based indexing (line numbers beginning at 0), though 1-based indexing is equally possible. In this code, each line of the special SMAP-comment begins with the identifying tag ++SMAP++. This tag (or any similar identifying tag) is intended to identify the location of the SMAP within the code. The first line of the SMAP (*L) is a header line and the remaining lines map source id's to Java line numbers. The second line of the SMAP (97:0) maps the visual activity having id 97 to the 0'th Java line in the block (the line int temp 1=3+5;). As mentioned, this example uses 0-based indexing, but 1-based indexing would work equally well. The next two lines of the relocatable SMAP provide mappings for the final two Java lines in the relocatable SMAP.

Note that the relocatable SMAP is not complete in itself for several reasons. First, the Java line numbers mentioned in the relocatable SMAP are not correct. This code needs to be inserted inside a containing class for it to be executable, and once that insertion is done, the line numbers in the relocatable SMAP would need to be relocated. Secondly, a header needs to be completed with additional information, such as the name of the class that it is intended to map, and the name of the stratum (or strata) which it controls. Details on the JSR-45 SMAP format are described in the relevant standard, but it is sufficient to note that there is more information required that can only be included once the embedded Java is actually used inside of a Java class file. A similar scenario would be true for any other programming language being used.

In a typical scenario, the block of code produced by an embedded editor (such as the Activity Editor) is included in an intermediate form (such as XML), which is then fed to a code generator, which then produces the final form of the code. Often the code generator itself actually generates more Java (or similar procedural or object oriented language), referred to herein as "primary" embedding. The other common case is when the code generation produces a form that is directly executable by a runtime engine (such as a BPEL engine), referred to herein as "secondary" embedding.

Whether in primary or secondary embedding, the code generation may produce a source map file with the same contents as the one contained in the comments of the embedded source, except that it is "relocated." This relocation is not merely to move the SMAP (although that does usually happen—it is placed in a separate file), but more importantly, the relocation must also replace the Java source line numbers with ones that are correct for the class in which the Java is embedded, and to add on any additional necessary header lines with information specific to the generated class. An example of this will be shown below.

In primary embedding, the code generator may place the embedded Java into a method in an inner class. The primary reason for this is that the parent Java may have its own debugging strategy that may itself use JSR-45 SMAPS, and that would potentially cause confusion in the debugging tool. For example, in the debugging environment supported by IBM Eclipse 3™ debugging can be carried out in only one stratum within a given class, e.g., the default stratum. For the purposes of this embodiment, it is sufficient to note that a stratum represents a given original source form. By placing the generated code within an inner class, the result is a separately compiled class, which can have its own SMAP and its own debugging stratum.

Consider the following example of primary embedding, in which the method someMethod contains code that has come from an embedded editor (e.g., the Activity Editor).

```
1    package pkg;
2
3    public class InnerTest {
4        private double int1 ;
5        private double int2;
6        private double int3;
7
8        protected class InnerClass{
9            public double someMethod( ){
10               int temp1 = 3 + 5;
11               int temp2 = temp1 + 10;
12               return Java.lang.math.sqrt(temp2);
13               //++SMAP++*L
14               //++SMAP++97:0
15               //++SMAP++98:1
16               //++SMAP++99:2
17           }
18       }
19
20       private int getInt1 O{
21           return int1;
22       }
23
24       public void doIt( ){
25           d1 = 1.0;
26           d2 = 2.0;
27           d3 = 3.0;
28           InnerClass ic = new InnerClass( );
29           ... ic.someMethod( )···;
30           ... ic.someMethod( )···;
31       }
32   }
```

As this code originated in the Activity Editor, the "input source line numbers" in the SMAP entries will refer to object id's in the Activity Editor (in this example the numbers 97, 98, and 99 in the SMAP are the object id's). In this example we are assuming that the code generator keeps the SMAP comments in place in the generated code, although that is not strictly necessary. In this example, the code generator would also produce a separate SMAP file that would look very similar to this:

```
SMAP
InnerTest.$InnerClass.java
ActivityEd itor
*S ActivityEd itor
*F
1 Something.BPEL
*L
97:10
98:11
99:12
*E
```

In this case, the Activity Editor stratum is referred to as "ActivityEditor." Because Java inner classes are being used, the form of the name of the SMAP file is ParentClass$Inner-Class.java.smap, where "ParentClass" and "InnerClass" are names chosen by the code generator. In this specific case it would be InnerTest$InnerClass.java.smap. This file would usually be placed in the same directory as the Java file. (Note that the parent class may have its own distinct SMAP file.) Because an inner class is used, debugging this ActivityEditor program can proceed independently of any other debugging that is occurring at the same time.

Looking at the above SMAP one can see that the Java line numbers have been relocated to their proper position in the parent class. As shown, in this example, the correct output source line numbers would be 10, 11, and 12. Note that this is true even though someMethod is incorporated into an inner class, e.g., using an inner class does not affect the fact that the line numbers are relative to the parent class.

Figure 4:
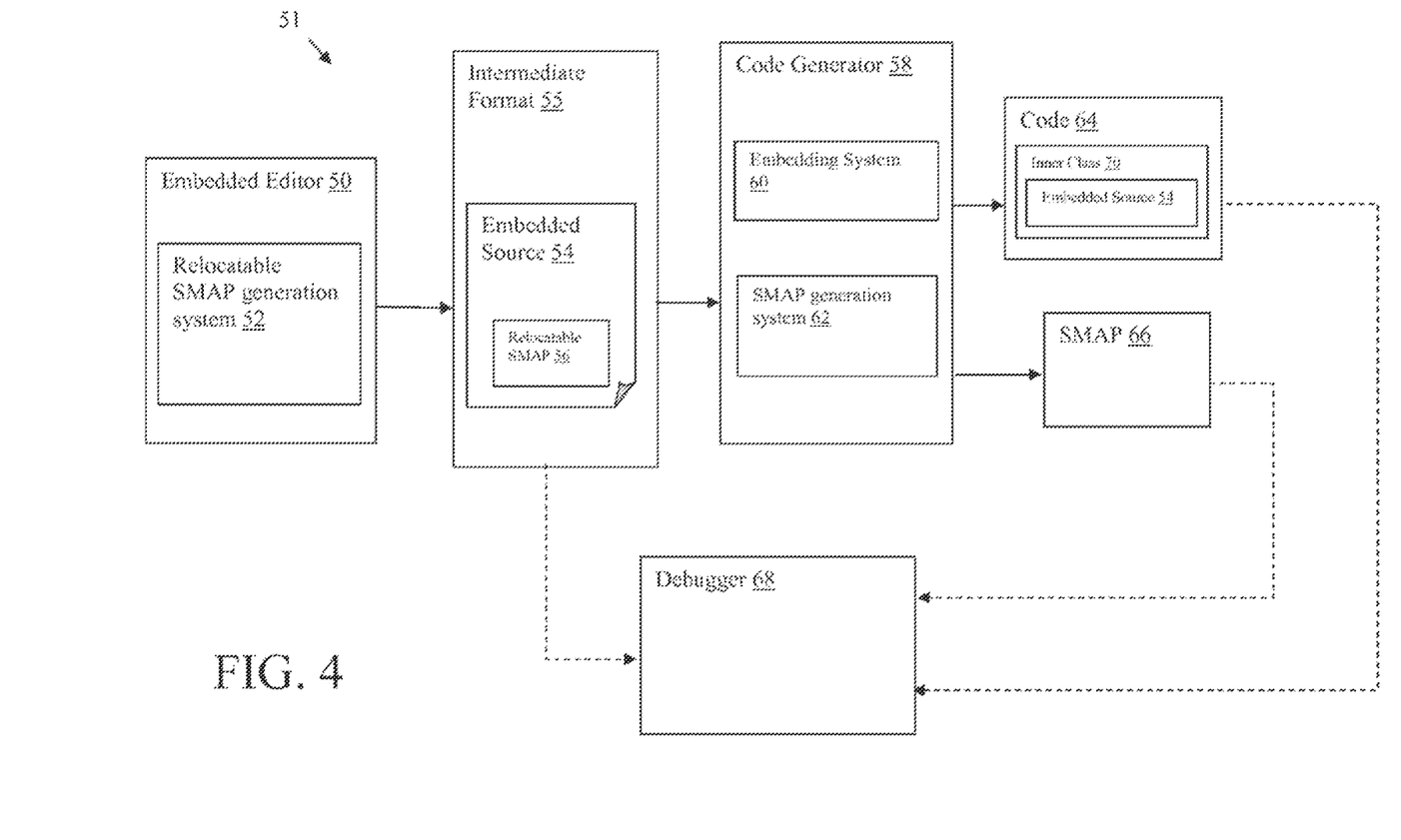
FIG. 4 depicts a development environment that can debug embedded source code.

FIG. 4 depicts an illustrative development environment 51 that provides embedded debugging. Embedded editor 50 (e.g., an Activity Editor) includes a relocatable SMAP generation system 52 that generates embedded source 54 (e.g., Java) having a relocatable SMAP 56. The embedded source 54, along with the intermediate format 55 (e.g., XML) is then fed into a code generator 58. Code generator 58 includes: an embedding system 60 for generating program code 64 and embedding the embedded source 54 therein; and an SMAP generation system 62 for generating SMAP 66. In the case of primary embedding, the embedded source 54 is embedded in an inner class 70 in the program code 64. Debugger 68 can then be used to debug both the intermediate format 55 and the embedded source 54.

As noted above, in order to create an SMAP 66 from the relocatable SMAP 56, SMAP generation system is required to perform several functions, including relocating the SMAP information and adding header information.

An illustrative algorithm for handling relocation is as follows. As noted, the embedded editor 50 produces a block of embedded source 54 that, after code-generation, is inserted at a specific location in a final program code 64. The block of embedded source 54 includes the relocatable SMAP 56, which includes offset line numbers. Let n be the absolute line number of the first line of the block of embedded source 54 in the final program code 64. Generate a final SMAP 66, first by generating appropriate headers (for instance, containing class and stratum information), followed by additional entries as follows:

1. locate the SMAP entry by using its well known tag format
2. for each SMAP entry that is administrative, such as a header, concatenate that header (not including the comment tag) onto the source map
3. for each SMAP entry in the relocatable SMAP that is not administrative, use the known format of the entry to locate the offset line number. Call the numeric value of this offset line number "0."
4. produce a line entry in the SMAP consisting of the line entry in the comment (minus the comment tag), but with "0" replaced by the result of the expression "o+n"
5. After producing as many line entries in the SMAP as there are line entries in the comment, complete the SMAP 66 with any required administrative lines and close the file.

This algorithm assumes O-based indexing, but may be adjusted for 1-based indexing.

Note that within one parent class there can be more than one instance of a code block originating with the embedded editor. Each of these embedded relocatable SMAPs needs to be properly relocated to the correct absolute location in the parent class file, with a separate SMAP file 66 for each. If all of the embedded Java comes from the same editor (for example the Activity Editor) then it is not necessary to use separate inner classes. In this case the parent code generator 58 can amalgamate all the embedded Java into one inner class (and a single SMAP 66 would be produced), or not use any inner classes at all. In this latter scenario, the parent code generator 58 would put each code block in its own method, and produce a SMAP 66 for the parent class. Regardless, the contents of the individual SMAP comments in the embedded source 54 must be incorporated and relocated appropriately.

Secondary embedding proceeds in the same manner as primary embedding, except that the class that the code is embedded within is whatever utility class the code generator 58 produces for the purpose of invoking embedded source 54, such as Java. In the specific case of BPEL, this is called a backing class. Because the utility or backing class is never debugged in and of itself, there is more liberty in where to place the embedded source 54, e.g., inner classes are not a necessity in this case. However, in practice, they are so convenient that they can be used anyway in the case of BPEL.

It should be appreciated that the teachings of the present invention could be offered as a business method on a subscription or fee basis. For example, a computer system comprising visual paradigm debugging or embedded debugging could be created, maintained and/or deployed by a service provider that offers the functions described herein for customers. That is, a service provider could offer to provide debugging technologies as described above.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system for generating a source map (SMAP) from a visual paradigm that can be used along with an associated code output by a debugging tool to debug the visual paradigm, the system comprising a processor to implement:
    a visual object ordering system that determines an order number for each of a plurality of visual objects in the visual paradigm; and
    a mapping system that maps the order number of each visual object to a set of line numbers in the associated code output.

2. The system of claim 1, wherein the associated code output comprises Java code.

3. The system of claim 1, wherein the visual objects comprise data transformations.

4. The system of claim 1, wherein the visual objects comprise business rules.

5. The system of claim 1, wherein the mapping system maps a last line of the associated code output of each visual object to the order number of the visual object multiplied by a scaling factor.

6. The system of claim 5, wherein the mapping system maps lines of custom code embedded in a visual object to the order number of the visual object multiplied by the scaling factor plus an offset.

7. A method for generating a source map (SMAP) used for debugging embedded source code, comprising:
    embedding source code into an intermediate format;
    generating a relocatable SMAP as comments within the embedded source code;
    generating program code from the intermediate format that includes the embedded source code; and
    generating the SMAP from the relocatable SMAP with line numbers that are correct for a class in which the embedded source code is embedded.

8. The method of claim 7, wherein the embedded source code comprises Java.

9. The method of claim 7, wherein the intermediate format comprises XML (extensible mark-up language).

10. The method of claim 7, wherein the embedded source code is embedded within the parent source code as an inner class.

11. The method of claim 7, wherein generating the SMAP includes:
    generating header information.

12. A system for generating a source map (SMAP) for use in debugging embedded source code, the system comprising a processor to implement:
    an embedded editor for embedding source code into an intermediate format and generating a relocatable SMAP within the embedded source code; and
    a code generator that includes a system for generating program code from the intermediate format that includes the embedded source code, and a system for generating the SMAP from the relocatable SMAP with line numbers that are correct for a class in which the embedded source code is embedded.

13. The system of claim 12, wherein the embedded source code comprises Java.

14. The system of claim 12, wherein the intermediate format comprises XML (extensible mark-up language).

15. The system of claim 12, wherein the embedded source code is embedded within a parent source code as an inner class.

16. The system of claim 12, wherein the system for generating the SMAP includes generating header information.

17. The system of claim 12, wherein the relocatable SMAP is contained within the embedded source code as comments.

* * * * *